United States Patent
Koppes et al.

(10) Patent No.: US 9,229,976 B2
(45) Date of Patent: Jan. 5, 2016

(54) IDENTIFYING ENTITIES BASED ON INTERACTIVITY MODELS

(71) Applicant: Microsoft Technology Licensing, LLC, Redmond, WA (US)

(72) Inventors: Samuel Koppes, Bothell, WA (US); Neal Myerson, Seattle, WA (US); Srikrishna Gali, Redmond, WA (US); Paul Lo, Mill Creek, WA (US); Joseph Masterson, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 14/042,582

(22) Filed: Sep. 30, 2013

(65) Prior Publication Data

US 2015/0095368 A1    Apr. 2, 2015

(51) Int. Cl.
*G06F 17/30*    (2006.01)

(52) U.S. Cl.
CPC ............... *G06F 17/30424* (2013.01)

(58) Field of Classification Search
CPC ................................. G06F 17/30424
USPC ........................................ 707/769
See application file for complete search history.

(56) References Cited

U.S. PATENT DOCUMENTS

| | | | |
|---|---|---|---|
| 7,856,411 B2 | 12/2010 | Darr | |
| 2009/0177744 A1 | 7/2009 | Marlow et al. | |
| 2011/0078188 A1 | 3/2011 | Li et al. | |
| 2011/0208814 A1 | 8/2011 | Bostrom et al. | |
| 2012/0290565 A1 | 11/2012 | Wana et al. | |
| 2012/0290649 A1 | 11/2012 | Ramirez et al. | |
| 2013/0169682 A1 | 7/2013 | Novak et al. | |
| 2013/0198685 A1* | 8/2013 | Bernini et al. | 715/800 |
| 2015/0051891 A1* | 2/2015 | Walsh et al. | 703/6 |
| 2015/0156148 A1* | 6/2015 | Doulton | 380/4 |

FOREIGN PATENT DOCUMENTS

JP    2007073050 A   *   3/2007

OTHER PUBLICATIONS

Bontcheva et al., Making Sense of Social Media Streams through Semantics: a Survey, 2012, 36 pages.*
Choi, J. et al., "Mining Social Relationship Types in an Organization Using Communication Patterns," In Proceedings of the Conference on Computer Supported Cooperative Work '13, Feb. 23-27, 2013, 7 pages.

* cited by examiner

*Primary Examiner* — Noosha Arjomandi
(74) *Attorney, Agent, or Firm* — Louise Bowman; Tom Wong; Micky Minhas

(57) ABSTRACT

An interactivity system is provided that tracks interactivity between a target entity and participant entities and identifies entities whose interactions satisfy an interactivity criterion. The interactivity system maintains for the target entity interactivity models between the target entity and each participant entity, with each interactivity model modeling the interactions between the target entity and that participant entity. The interactivity system dynamically updates the interactivity models as notification of interactions are received. Upon receiving a query that specifies an interactivity criterion, the interactivity system analyzes the interactivity models to determine whether the interactivity criterion is satisfied. When an interactivity criterion is satisfied, the interactivity system sends a response to the query indicating that the interactivity criterion is satisfied along with the identity of the entity that satisfies the interactivity criterion.

12 Claims, 10 Drawing Sheets interactivity models 100

Bob 110

| Participant | T/F | D | W | M | Y |
|---|---|---|---|---|---|
| David | T | 0 | 1 | 2 | 50 |
| David | F | 0 | 0 | 0 | 3 |
| Eric | T | 2 | 5 | 10 | 60 |
| Eric | F | 1 | 6 | 12 | 76 |

(111: David rows; 112: Eric rows)

Eric 120

| Participant | T/F | D | W | M | Y |
|---|---|---|---|---|---|
| Bob | T | 1 | 6 | 12 | 76 |
| Bob | F | 2 | 5 | 10 | 60 |
| Nancy | T | 0 | 0 | 0 | 5 |
| Nancy | F | 0 | 0 | 0 | 6 |

(121: Bob rows; 122: Nancy rows)

David 130

| Participant | T/F | D | W | M | Y |
|---|---|---|---|---|---|
| Bob | T | 0 | 0 | 0 | 3 |
| Bob | F | 0 | 1 | 2 | 50 |
| Carol | T | 2 | 5 | 20 | 101 |
| Carol | F | 1 | 7 | 26 | 120 |
| Kate | T | 3 | 4 | 4 | 4 |
| Kate | F | 2 | 3 | 3 | 3 |

(131: Bob; 132: Carol; 133: Kate)

Carol 140

| Participant | T/F | D | W | M | Y |
|---|---|---|---|---|---|
| David | T | 1 | 7 | 26 | 120 |
| David | F | 2 | 5 | 20 | 101 |
| Larry | T | 0 | 0 | 0 | 5 |
| Larry | F | 0 | 0 | 0 | 0 |
| Kate | T | 0 | 0 | 10 | 72 |
| Kate | F | 0 | 0 | 9 | 61 |

(141: David; 142: Larry; 143: Kate)

interactivity models 100

Bob 110

| Participant | T/F | D | W | M | Y |
|---|---|---|---|---|---|
| David | T | 0 | 1 | 2 | 50 |
| David | F | 0 | 0 | 0 | 3 |
| Eric | T | 2 | 5 | 10 | 60 |
| Eric | F | 1 | 6 | 12 | 76 |

111, 112

Eric 120

| Participant | T/F | D | W | M | Y |
|---|---|---|---|---|---|
| Bob | T | 1 | 6 | 12 | 76 |
| Bob | F | 2 | 5 | 10 | 60 |
| Nancy | T | 0 | 0 | 0 | 5 |
| Nancy | F | 0 | 0 | 0 | 6 |

121, 122

David 130

| Participant | T/F | D | W | M | Y |
|---|---|---|---|---|---|
| Bob | T | 0 | 0 | 0 | 3 |
| Bob | F | 0 | 1 | 2 | 50 |
| Carol | T | 2 | 5 | 20 | 101 |
| Carol | F | 1 | 7 | 26 | 120 |
| Kate | T | 3 | 4 | 4 | 4 |
| Kate | F | 2 | 3 | 3 | 3 |

131, 132, 133

Carol 140

| Participant | T/F | D | W | M | Y |
|---|---|---|---|---|---|
| David | T | 1 | 7 | 26 | 120 |
| David | F | 2 | 5 | 20 | 101 |
| Larry | T | 0 | 0 | 0 | 5 |
| Larry | F | 0 | 0 | 0 | 0 |
| Kate | T | 0 | 0 | 10 | 72 |
| Kate | F | 0 | 0 | 9 | 61 |

IDENTIFYING ENTITIES BASED ON INTERACTIVITY MODELS

BACKGROUND

A social network consists of individuals and their relationships to other individuals. For example, within a company, the employees and their relationships to other employees, such as being members of the same development team or the same management committee, form a social network. Each of the employees may also have relationships to their family members and other non-family friends. Each relationship within a social network specifies a direct relationship between two individuals, such as being members of the same team. Individuals may also have indirect relationships with other individuals. For example, Tom and Mary may not know each other, but both Tom and Mary have a relationship with Jim. In such a case, Tom and Mary would have an indirect relationship to each other through Jim. The distance (number of relationships) between two individuals within a social network is commonly referred to as their "degree of separation." For example, Tom and Mary would have two degrees of separation.

A social network that identifies individuals and their relationships with other individuals can be automatically derived from data stored by computer systems. Many individuals use their computer systems to store indications of relationships to other individuals. In particular, many software applications allow a user to explicitly store names of others with whom the user has a relationship. The names (or other identifiers such as electronic mail addresses) of the other users are stored in address lists for electronic mail programs, in contact lists for instant messaging programs, in invitation lists for event organizing programs, and so on. In addition, the names of the other users can be derived from data that is not in an explicit list. For example, the names of users can be derived from the to, from, and cc fields of electronic mail messages, from meeting entries within a calendar, from letters stored as electronic documents, and so on. Each of these other users has a relationship, referred to as a direct relationship, with the user regardless of the "closeness" of the relationship. For example, a user may have a relationship with a co-worker and a relationship with a worker at another company that was cc'd on the same electronic mail message. In this example, the relationship with the co-worker may be closer than the relationship with the worker at the other company. The users with whom a user has a relationship are referred to generally as "contacts" of that user.

Valuable information can be derived from the mining of social networks. For example, a salesperson in the sales department of company may want to make a sales pitch to a target organization, but that salesperson may not have any contacts within the target organization. Traditionally, that salesperson would either make a cold call to someone at the target organization or try to find someone who can help facilitate such a contact, such as by asking fellow employees in person or via email if they can help. The making of a cold call has disadvantages because the person called may not be the best person in the target organization to field such a call or may simply not respond to such cold calls. The asking of fellow employees also has disadvantages because the employee with the best contact may not respond or may not even be asked. The automatic mining of the social networks of the company can help identify who has a relationship with someone at that target company. Further, the automatic mining might also identify which contact at the target organization has the most relationships with employees of the company, which employee of the company has a relationship with a contact of interest at the target company (e.g., a purchasing manager), and so on.

Although valuable information can be mined from a social network, the relationships automatically derived from data stored by computer systems may be somewhat misleading. Continuing with the example, a person in the mail room of the company may store in their contact list the names and addresses of people to whom mail is sent. That person's contact list may include the president of the target organization, the purchasing manager of the target organization, and so on. The automatic mining may identify that that person has the strongest relationship with the target organization, but, of course, that person would likely not be of much help in facilitating an introduction at the target organization.

SUMMARY

In some embodiments, an interactivity system analyzes interactivity between a target entity and participant entities to identify entities whose interactions satisfy an interactivity criterion. The interactivity system receives indications of interactions between the target entity and participant entities. The interactivity system maintains for the target entity interactivity models between the target entity and each participant entity based on the interactions between the target entity and that participant entity. An interactivity model provides a model of the interactions between the target entity and a participant entity. To identify entities whose interactions satisfy an interactivity criterion, the interactivity system analyzes the interactivity models of the target entity to determine whether the interactivity criterion is satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 is a block diagram illustrating example interactivity models in one embodiment of the interactivity system.

DETAILED DESCRIPTION

Figure 2:
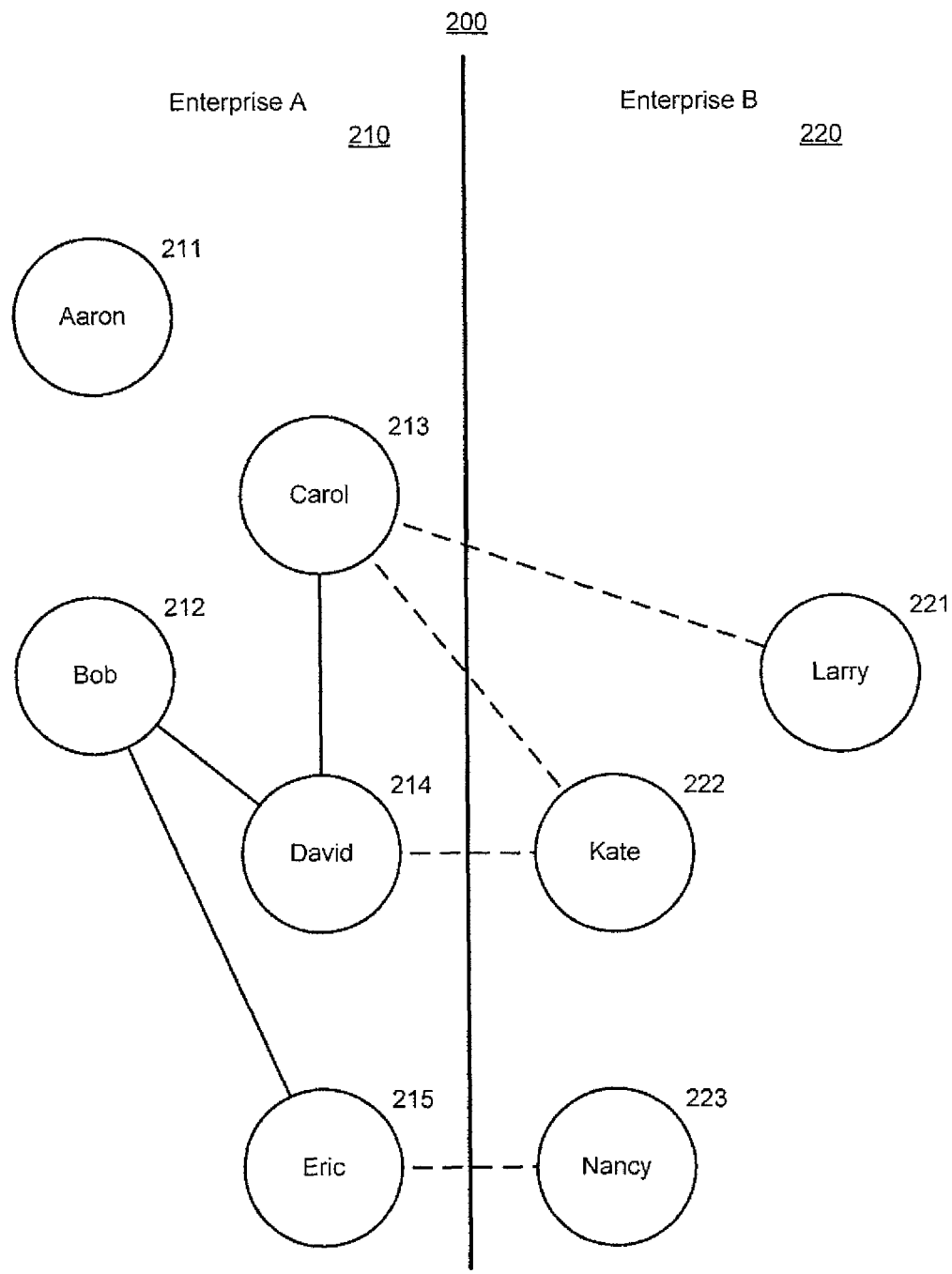
FIG. 2 illustrates an interactivity graph represented by the interactivity models of FIG. 1.

A method and system for tracking and analyzing interactivity between entities is provided. In some embodiments, an interactivity system maintains interactivity models that model the interactions between entities. The interactions between entities may include, for example, electronic mail messages, text messages, instant messages, scheduled meetings, voice mails, phone calls, document collaboration efforts, and so on. For each entity, the interactivity system may maintain an interactivity model for each participant entity that the entity interacts with. For example, if an entity exchanges electronic mail messages with three other entities, then the interactivity system may maintain for that entity a separate interactivity model for each of the three participant entities. Each interactivity model may model the types of interactions, number of interactions, time frames of interactions, sizes of interactions, quality of interactions (e.g., based on number of recipients), and so on. Therefore, one interactivity model may indicate that the entity and a participant entity interact several times a day, whereas another interactivity model may indicate that the entity and another participant entity interacted frequently a year ago but not recently. The interactivity system may maintain the interactivity models dynamically or in real time as indications of interactions are received. For example, when an entity sends an electronic mail message to a participant entity, the interactivity system receives an indication of the electronic mail message and then updates that entity's interactivity model for that participant entity. Similarly, when that entity receives an electronic mail message from that participant entity, the interactivity system receives an indication of that electronic mail message and then updates the entity's interactivity model for that participant entity.

In some embodiments, the interactivity system supports the identifying of interactivity models that satisfy an interactivity criterion to identify entities of interest. The interactivity criterion may specify characteristics of one or more interactivity models. For example, a salesperson with a company may know that Kate Smith is the purchasing manager within a target organization and may want to find someone within the company who has recently interacted with Kate. The salesperson would submit to the interactivity system a query that specifies an interactivity criterion, such as "interacted with Kate Smith of the target organization at least five times in the last year and at least once in the last month" or "interacted with Kate Smith of the target organization using two different types of interactions in the last month." The query may be expressed in various forms such as in a declarative form (e.g., SQL like), a procedural form (e.g., a short program), a natural language form, and so on. The interactivity system may then search the interactivity models of target entities to identify those entities who satisfy the interactivity criterion. Continuing with the example, the target entities may be all the employees of the company or just those employees who match a target profile, such as being above a certain managerial level. Upon identifying the employees that satisfy the interactivity criterion, the interactivity system provides the names of those employees to the salesperson, who can then contact those employees seeking an introduction to Kate. The use of an interactivity criterion allows a user to define the characteristics of interactions that are of interest. For example, if the salesperson wants to discuss a current issue with someone from the target organization, then the interactivity criterion may indicate that recent frequent interactions are important. In contrast, if the salesperson wants to discuss an ongoing issue, then the interactivity criterion may indicate that sustained, albeit not frequent, interactions are important.

In some embodiments, the interactivity system may store the interactivity models in a distributed manner. For example, the interactivity models between an entity and each of the participant entities that the entity interacted with may be stored at a computing device of that entity. Thus, each entity may have an interactivity model repository that stores an interactivity model for each of its participant entities. When the interactivity system receives a query from a user, it may send the query to the computing device of the target entities, which may be all or a subset of the entities. Upon receiving a query, the computing device of a target entity analyzes its interactivity models to identify which entities, the target entity or one or more of the participant entities, satisfy the interactivity criterion. The computing device of the target entity then sends a response identifying the entities that satisfy the interactivity criterion. After receiving the responses, the interactivity system generates results for the query from the responses and provides the results to the user. The interactivity system may apply some post-response processing to generate the results, such as sorting or filtering. Also, the response may include the interactivity models of participant entities to support a more detailed post-response processing, such as which target entity had the most interactions with a certain participant entity in the last week. Although the interactivity models may be stored in a distributed manner, they may also be stored in a central repository or stored in multiple repositories that each store the interactivity models for multiple entities.

In some embodiments, the interactivity system may maintain separate interactivity models for each interaction type or maintain combined or aggregate interactivity models. For example, the interactivity system may maintain separate interactivity models for interactions via electronic mail and voice mail. Alternatively, the interactivity system may aggregate interactions of different types into a combined interactivity model.

In some embodiments, the interactivity system may be implemented with a client-server architecture. In such an architecture, a server component manages receiving queries from users, sending the queries to client components of the computing devices of the target entities, receiving the responses from those computing devices, generating results from the responses, and providing the results to the user. The interactivity system may also be implemented with a peer-to-peer architecture. In such an architecture, the computing devices of the entities would be peers that send queries to the peers and receive responses from the peers.

The interactivity system may use a variety of techniques to model the interactions between entities. For example, the interactivity system may model the interactions by the number of interactions between an entity and a participant entity during different time frames (e.g., today, this week, this month, and this year). The interactivity system may also maintain separate counts based on whether the entity or the participating entity initiated the interaction. So, in the case of electronic mail messages, the interactivity model may indicate the number of electronic mail messages sent by the entity to a participant entity and the number of electronic mail messages sent by the participant entity to the entity. If the interactivity system maintains a combined interactivity model for an entity, the interactivity system may weight the counts of different interaction types differently. For example, the interactivity system may give more weight to a text message than an electronic mail message.

The interactivity system may also use various scoring techniques to represent different characteristics of the interactivity models. For example, an interactivity model may include a recency score and a longevity score. The recency score would indicate how recently an entity and a participant entity interacted, whereas a longevity score would indicate how consistently the entity and that participant entity interacted over time. The interactivity model may include a quality score to indicate the quality of the interactions. For example, an electronic mail message to 50 recipients may have a lower quality than an electronic mail message sent to only one recipient. Although a single score could be used to characterize the interactivity between entities, a single score would not be effective to differentiate the different characteristics.

FIG. 1 is a block diagram illustrating example interactivity models in one embodiment of the interactivity system. The interactivity models 100 include interactivity models 110 for Bob, interactivity models 120 for Eric, interactivity models 130 for David, and interactivity models 140 for Carol. The interactivity models 110 for Bob include interactivity model 111 and interactivity model 112. The interactivity model 111 models the interactions between Bob and David. The interactivity model 111 for Bob tracks the interactions sent from David to Bob and the interactions sent from Bob to David separately. The interactivity models store the counts of interactions for the current day, the current week, the current month, and the current year. The interactivity model 111 indicates that Bob sent to David 0, 1, 2, and 50 electronic mail messages during each of the time frames, and that Bob received from David 0, 0, 0, and 3 electronic mail messages during each of the time frames. The interactivity model 131 for David tracks the same interactions with Bob, but with the to and from counts interchanged.

FIG. 2 illustrates an interactivity graph represented by the interactivity models of FIG. 1. The interactivity graph 200 includes nodes 211-215 for the employees of Enterprise A 210 and nodes 221-223 for the employees of Enterprise B 220. The lines between the nodes indicate that an interactivity model exists for the interactions between the employees represented by the nodes. For example, since the interactivity model 111 indicates that Bob and David have interacted, there is a line between node 212 for Bob and node 214 for David. The solid lines between the nodes indicate interactions between employees of the same enterprise, and the dashed lines indicate interactions between the employees of different enterprises. The absence of a line between nodes indicate that there has been no interaction between the people represented by the nodes. For example, since there is no line between node 212 for Bob and node 213 for Carol, they have not interacted. The interactivity models 142 and 143 indicate that Carol has interacted with both Larry and Kate of Enterprise B. As a result, there are dashed lines between node 213 for Carol and node 221 for Larry and between node 213 for Carol and node 222 for Kate. Although the lines between the nodes indicate interactions between the people represented by the nodes, the lines provide no indication of the quality or quantity of interactions. The interactivity models 100, however, provide a model of the interactions from which the quality and quantity can be assessed. For example, interactivity model 133 for David and Kate indicates that they have only recently started interacting because the counts for the current week are the same as the counts for the total year. In contrast, interactivity model 143 for Carol and Kate indicates that they interacted many times throughout the year but not recently. Therefore, if scores were generated for the interactivity models, interactivity model 133 may have a high recency score and a low longevity score, whereas interactivity model 143 may have a low recency score and a high longevity score.

The interactivity system may be used, for example, to identify the person within Enterprise A most likely to make an introduction to a certain person of Enterprise B. For example, Aaron, represented by node 211, has had no interactions with anyone at Enterprise B. So Aaron may formulate a query with an interactivity criterion that specifies to find an employee of Enterprise A who has had an interaction with Kate within the last week. Upon submitting the query, the interactivity system checks the interactivity models of each of the employees of Enterprise A to see who has had interactions with Kate. In this case, David, as indicated by interactivity model 133, and Carol, as indicated by interactivity model 143, have had interactions with Kate. David's interactions with Kate satisfy the interactivity criterion because David and Kate have had seven interactions in the last week. In contrast, Carol's interactions with Kate do not satisfy the interactivity criterion because Carol and Kate have had no interactions within the last week. If Aaron, however, wanted to identify which employee of Enterprise A had the best long-term relationship with Kate, then the interactivity criterion may specify at least 50 interactions within the past year and at least 10 interactions within the last month. In such a case, Carol's interactions with Kate would satisfy that interactivity criterion, but David's interactions with Kate would not.

Figure 3:
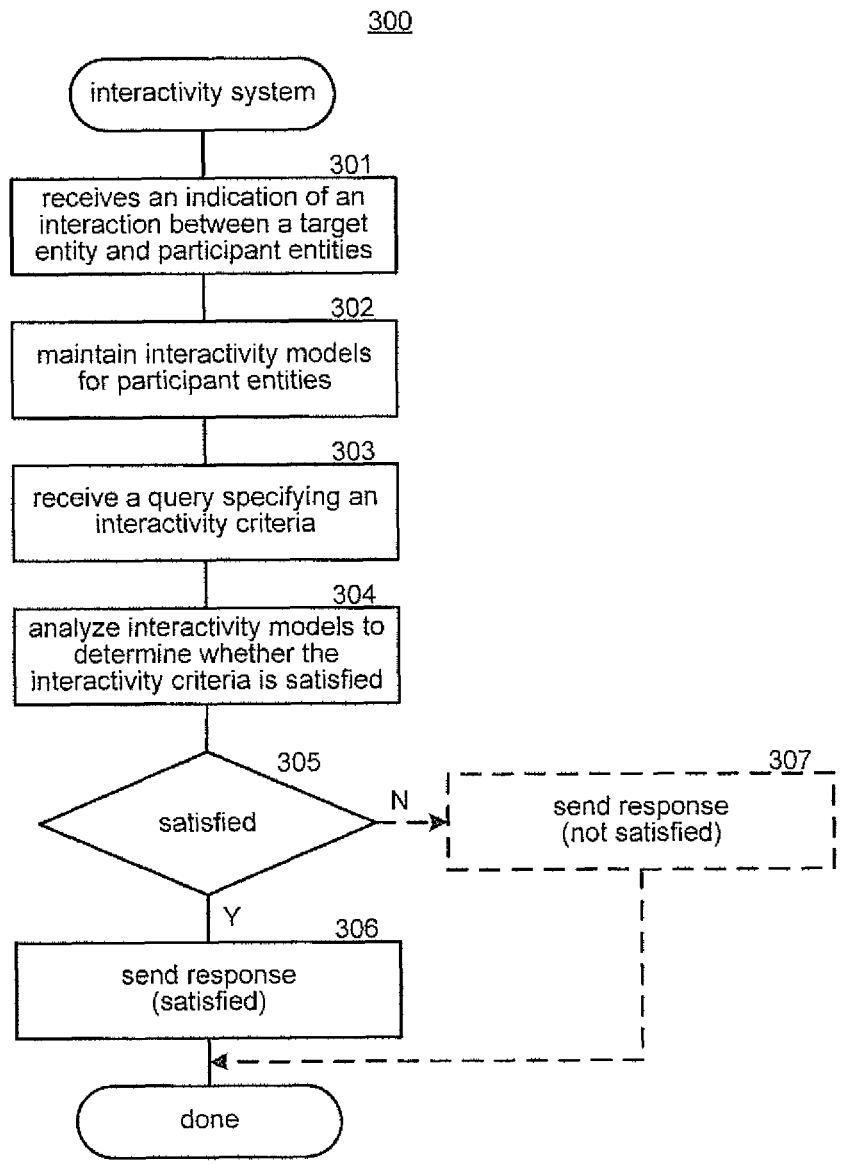
FIG. 3 is a flow diagram that illustrates the tracking of interactions between entities in some embodiments.

FIG. 3 is a flow diagram that illustrates the tracking of interactions between entities in some embodiments. The interactivity system 300 tracks interactions between entities, updates their interactivity models, and identifies entities that satisfy an interactivity criterion. In block 301, the system receives indications of interactions between a target entity and participant entities. For example, the indication may include the sender, the recipients, and the send date of an electronic mail message; the attendees and time of a meeting; the authors and last edit date of a document; and so on. The indications may be received from an electronic mail system, a calendaring system, a collaboration system, and so on. In block 302, the system maintains for the target entity the interactivity models for the participant entities. If the target entity has no interactivity model for a participant entity, then the system initializes an interactivity model. If the target entity has an interactivity model for a participant entity, then the system updates the model. In block 303, the system receives a query specifying an interactivity criterion. The query may be received from a server component of the interactivity system or from a peer component. In block 304, the system analyzes the interactivity models to determine whether the interactivity criterion is satisfied. In decision block 305, if the interactivity model is satisfied, then the component continues at block 306, else component continues at block 307. In block 306, the component sends a response indicating that the interactivity criterion has been satisfied and then completes. In block 307, the system optionally (as indicated by the dashed lines) sends a response indicating that the interactivity criterion is not satisfied and then completes.

Figure 4:
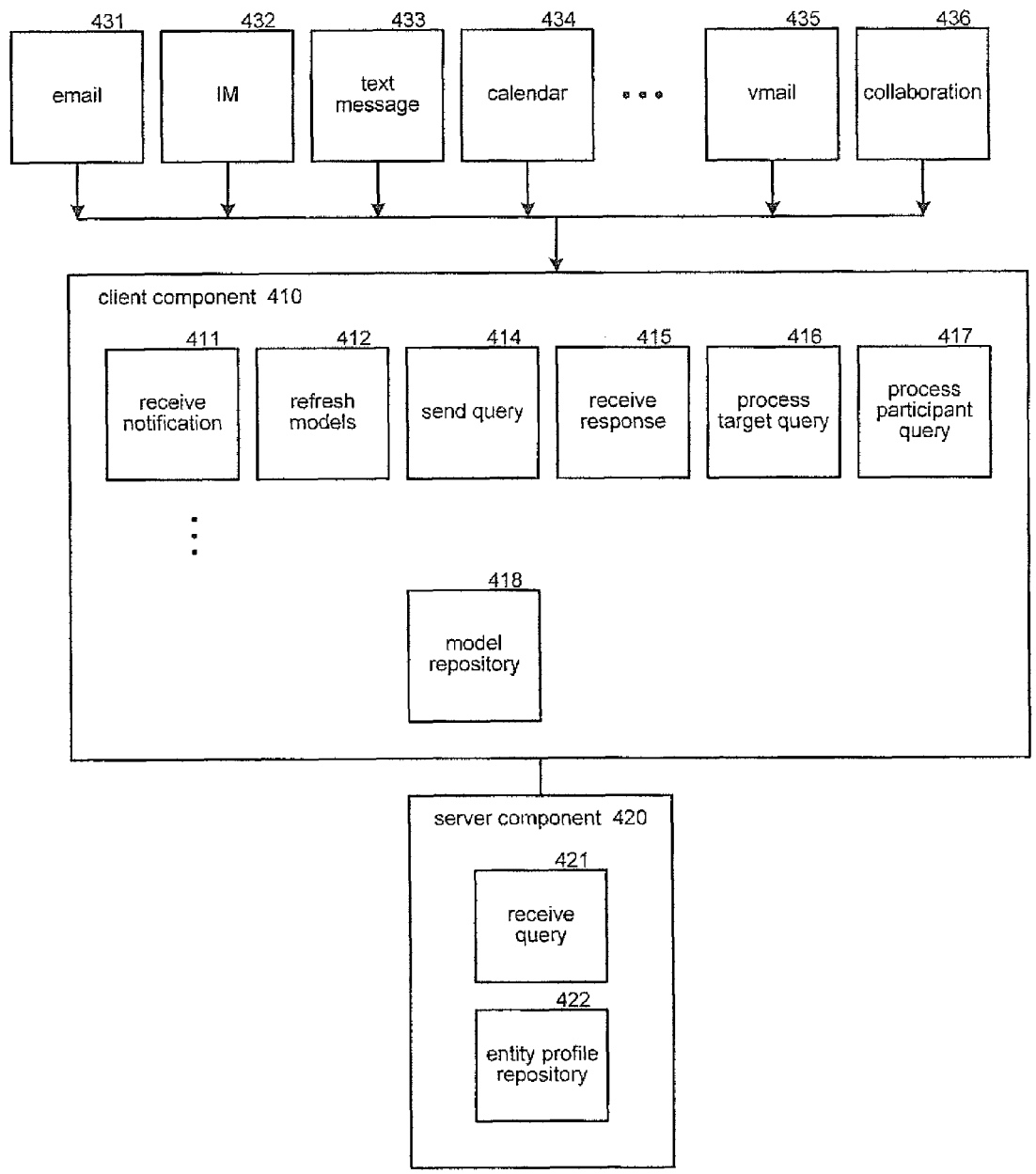
FIG. 4 is a block diagram illustrating components of the interactivity system in some embodiments.

FIG. 4 is a block diagram illustrating components of the interactivity system in some embodiments. The interactivity system 400 may include a client component 410 and a server component 420. The client component may receive indications of interactions from interaction systems, such as an electronic mail system 431, an instant messaging system 432, a text message system 433, a calendar system 434, a voice mail system 435, and a collaboration system 436. The client component may include a receive notification component 411, a refresh models component 412, a send query component 414, a receive response component 415, a process target query component 416, and a process participant query component 417. The client component may also include a model repository 418. The client component may include a separate receive notification component for each of the interaction systems 431-436 as indicated by the ellipsis. The receive notification component is invoked when a notification of an interaction is received and updates in real time the interactivity models to reflect that interaction. The refresh models component may be invoked periodically (e.g., daily) to update the interactivity models such as by recalculating counts for time frames. The refresh models component may invoke a refresh models component for each interaction type (not shown) to update the interactivity models for that interaction type. The send query component sends a query formulated by a user (e.g., a person or a computer program) to the server. The receive response component receives a response to the query from the server and provides the response to the user. The process target query component processes a query designed to determine whether a target entity satisfies an interactivity criterion. The process participant query component processes a query designed to determine whether a participant entity satisfies an interactivity criterion. The model repository stores an interactivity model for each participating entity. The server component includes a receive query component 421 and an entity profile repository 422. The receive query component receives from a client component a query specifying an interactivity criterion, identifies target entities, sends a query to each target entity, receives the responses, and provides the results to the client component. The entity profile repository is a source of profiles of the entities such as demographic information, position within an organization, employment history, and so on.

The computing devices on which the interactivity system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that includes computer-readable storage media and data transmission media. The computer-readable storage media are tangible storage means that do not include a propagated signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the interactivity system. The data transmission media is media for transmitting data using propagated signals or carrier waves (e.g., electromagnetism) via a wire or wireless connection.

The interactivity system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the interactivity system may be implemented in hardware using, for example, an application-specific integrated circuit ("ASIC").

Figure 5:
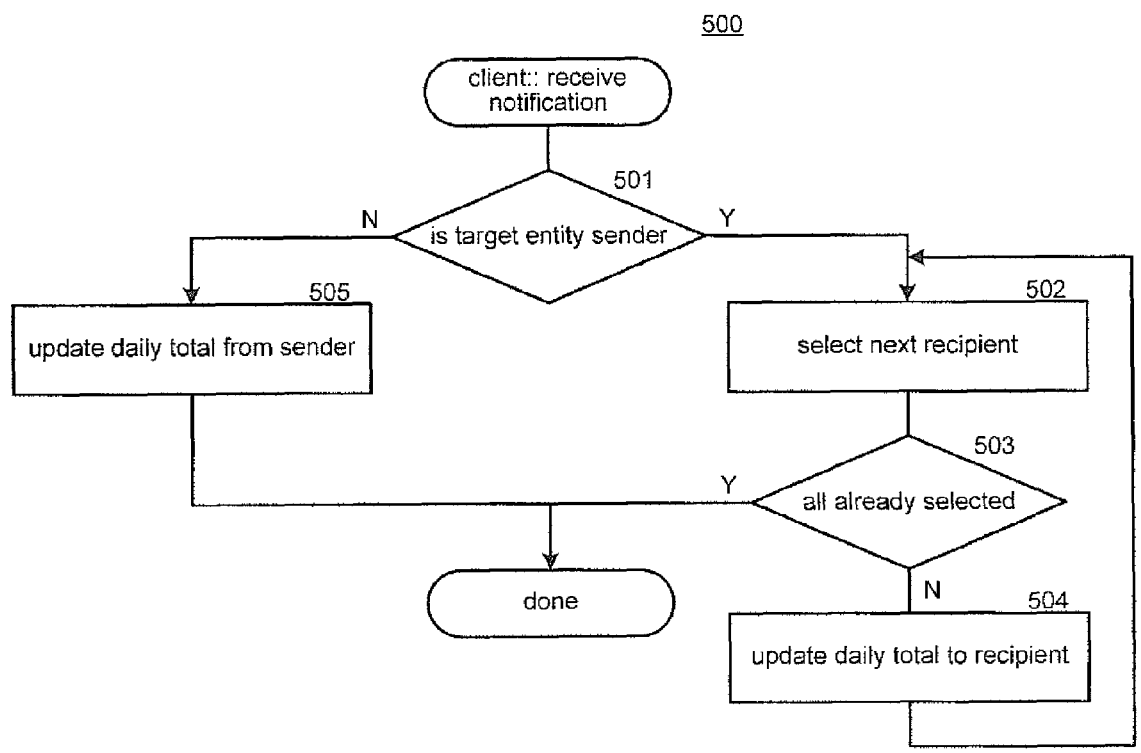
FIG. 5 is a flow diagram that illustrates the processing of a receive notification component for an electronic mail message of a client component in some embodiments.

FIG. 5 is a flow diagram that illustrates the processing of a receive notification component for an electronic mail message of a client component in some embodiments. The component 500 is passed a notification for a target entity and updates the interactivity models for the participant entities identified in the notification. In decision block 501, if the target entity is the sender of the electronic mail message, then the component continues at block 502, else the component continues at block 505. In block 502, the component selects the next recipient of an electronic mail message. In decision block 503, if all the recipients have already been selected, then the component completes, else the component continues at block 504. In block 504, the component updates the daily total in the interactivity model for the selected recipient (including creating a new interactivity model if none exists for the selected recipient) and then loops to block 502 to select the next recipient. In block 505, since the target entity is not the sender, the component updates the daily totals in the sender's interactivity model and then completes.

Figure 6:
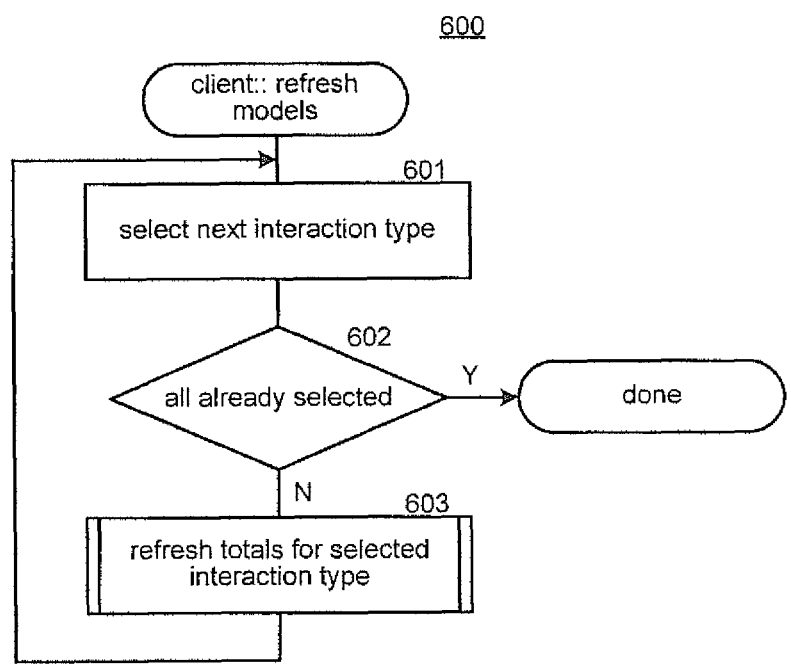
FIG. 6 is a flow diagram that illustrates the processing of a refresh models component of a client component in some embodiments.

FIG. 6 is a flow diagram that illustrates the processing of a refresh models component of a client component in some embodiments. The refresh models component 600 may be invoked periodically to refresh the interactivity models based on recent interactions. The component loops invoking components that are specific to an interaction type to refresh the totals or other statistical measures for that interaction type. In block 601, the component selects the next interaction type. In decision block 602, if all the interaction types have already been selected, then the component completes, else the component continues at block 603. In block 603, the component invokes the refresh totals component for the selected interaction type and then loops to block 601 to select the next interaction type.

Figure 7:
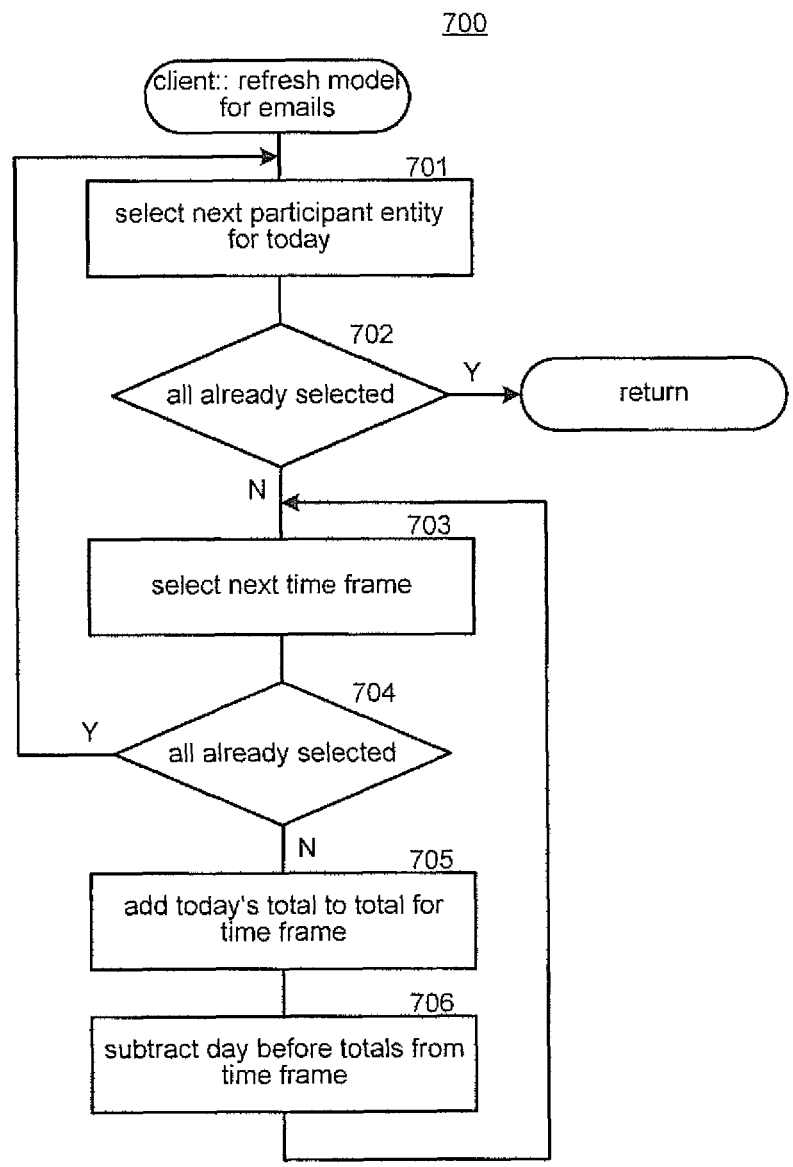
FIG. 7 is a flow diagram that illustrates the processing of a refresh models component for electronic mail messages of a client component in some embodiments.

FIG. 7 is a flow diagram that illustrates the processing of a refresh models component for electronic mail messages of a client component in some embodiments. The component 700 assumes that the interactivity models include totals of interactions for various time frames (e.g., week and month) and updates the totals of the time frames on a daily basis. The component also assumes that the daily totals are stored for each day of the longest time frame for the purpose of subtracting a daily total when a day is no longer within a time frame. For example, to refresh the totals for a year, the component adds the current day's total and subtracts the daily total for the day that is 366 days ago. In blocks 701-706, the component loops selecting the participant entities that the target entity interacted with in the current day and refreshes the interactivity models for those participating entities. In block 701, the component selects the next participant entity for the current day. In decision block 702, if all the participant entities have already been selected, then the component returns, else the component continues at block 703. In blocks 703-706, the component loops updating the totals for each time frame. In block 703, the component selects the next time frame. In decision block 704, if all the time frames have already been selected, then the component loops to block 701 to select the next participant entity, else the component continues at block 705. In block 705, the component adds the current day's total to the total for the selected time frame for the selected participant entity. In block 706, the component subtracts the total for the day before the selected time frame from the total for the selected time frame. The component then loops to block 703 to select the next time frame.

Figure 8:
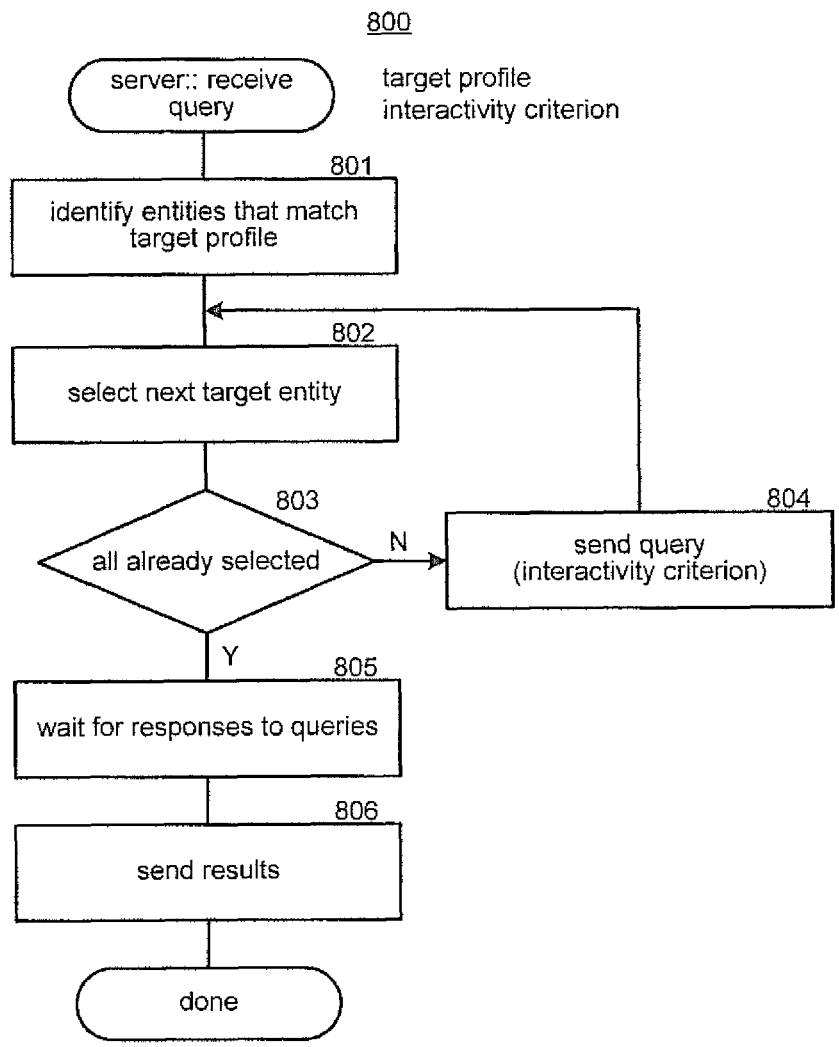
FIG. 8 is a flow diagram that illustrates the processing of a receive query component of a server component in some embodiments.

FIG. 8 is a flow diagram that illustrates the processing of a receive query component of a server component in some embodiments. The receive query component 800 receives a query that includes a target profile and an interactivity criterion. The target profile indicates the profile for the target entities. The query may be received from a client component, a web interface through which users submit queries, a computer program, or a variety of other possible sources. In block 801, the component identifies the entities as target entities that match the target profile based on the profiles of the entity profile repository. In block 802, the component selects the next target entity. In block 803, if all the target entities have already been selected, then the component continues at block 805, else the component continues at block 804. In block 804, the component sends a query that specifies the interactivity criterion to the selected target entity and then loops to block 802 to select the next target entity. In block 805, the component waits for the responses to the queries. In block 806, the component sends the results to the querying entity and then completes. The responses and the results may include interactivity models so that further processing can be performed by the submitter of the query. In some embodiments, the query may also specify a participant profile for participant entities. If so, the interactivity system would filter the results to include information for only those participant entities that match the participant profile as indicated by the profile repository.

Figure 9:
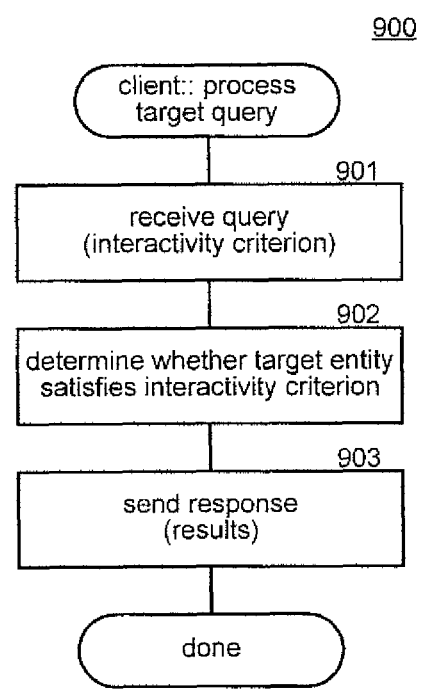
FIG. 9 is a flow diagram that illustrates the processing of a process target query component of a client component in some embodiments.

FIG. 9 is a flow diagram that illustrates the processing of a process target query component of a client component in some embodiments. The process target query component 900 is invoked when a client component receives a query from a user to identify a target entity that satisfies the interactivity criterion. In block 901, the component receives the query that specifies the interactivity criterion. In block 902, the component determines whether the target entity satisfies the interactivity criterion by analyzing the interactivity models of participant entities. In block 903, the component sends a response indicating whether the target entity satisfies the interactivity criterion and then completes. The response may also include the interactivity models used to determine that the target entity satisfied the interactivity criterion.

Figure 10:
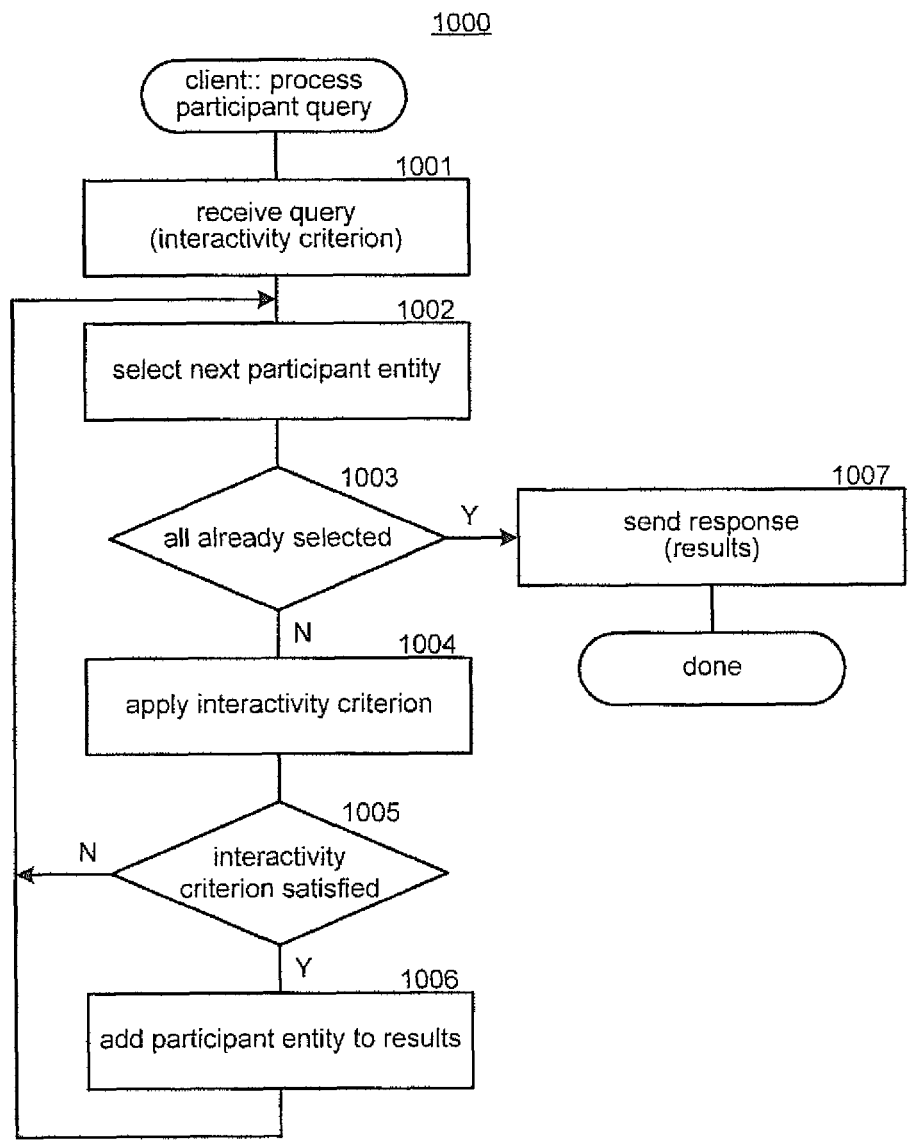
FIG. 10 is a flow diagram that illustrates the processing of a process participant query component of a client component in some embodiments.

FIG. 10 is a flow diagram that illustrates the processing of a process participant query component of a client component in some embodiments. The process participant query component 1000 is invoked when a query is received for identifying whether any participant entities satisfy the interactivity criterion. In block 1001, the component receives a query that includes the interactivity criterion. In blocks 1002-1006, the component loops selecting each participant entity. In block 1002, the component selects the next participant entity. In decision block 1003, if all the participant entities have already been selected, then the component continues at block 1007, else component continues at block 1004. In block 1004, the component applies the interactivity criterion to the interactivity model of the selected participant entity. In decision block 1005, if the interactivity criterion is satisfied by the interactivity model of the selected participant entity, then the component continues at block 1006, else the component loops to block 1002 to select the next participant entity. In block 1006, the component adds the identity of the selected participant entity to the results and may add other information to the results, such as the interactivity model of the selected participant entity, and then loops to block 1002 to select the next participant entity. In block 1007, the component sends a response along with the results and then completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, an entity may be not only an individual, but also an organization, a division or a department of an organization, an electronic mail group, a computer program, a computing system, a device, and so on. Also, the notifications of interactions between entities can come from a wide variety of sources, such as a system that analyzes a video using face or voice recognition to identity entities who are interacting or analyzes credit card usage records to identify what stores a user interacts with. Because the interactivity models are maintained dynamically as notifications of interactions are received, the interactivity system can respond to queries based on up-to-date information. The maintaining of the interactivity models as summaries or models of interactions also allows the interactivity system to respond to queries quickly without having to analyze the raw data (e.g., individual electronic mail messages) to process each query. The interactivity models may model various characteristics of interactions. For example, in addition to totals for different time frames, the interactivity model for electronic mail messages may include average number of recipients per electronic mail message, average time between a target entity sending an electronic mail message to a participant entity and receiving a response from that participant entity, and a variety of other statistical measures. Accordingly, the invention is not limited except as by the appended claims.

The invention claimed is:

1. A computing system for tracking interactivity between entities, the computing system comprising:
   one or more computer-readable storage media that is not a propagated signal storing computer-executable instructions for
   accessing interactivity models, each interactivity model modeling interactions between a target entity and a participant entity, the interactivity models of the target entity being stored separately from the interactivity models of other target entities in a distributed matter;
   receiving indications of interactions between the target entity and participant entities;
   upon receiving an indication of an interaction between the target entity and a participant entity, updating in real time the interactivity model for the target entity and that participant entity;
   responding to a query by:
      receiving the query that specifies an interactivity criterion that specifies a characteristic of an interactivity model;
      analyzing interactivity models to determine whether the interactivity criterion is satisfied by one or more participant entities, wherein a participant entity satisfies the interactivity criterion when the interactivity model of the participant entity exhibits the characteristic; and
      sending a response to the query indicating whether the interactivity criterion is satisfied by one or more participant entities, and (Original) when the interactivity criterion is satisfied, identifying a participant entity that satisfies the interactivity criterion; and determining whether another target entity has participant entities that satisfy an interactivity criterion by:
    sending a query for the other target entity, the sent query specifying an interactivity criterion that specifies a characteristic of an interactivity model; and
    receiving a response to the sent query for the other target entity, the received response indicating whether the interactivity criterion is satisfied by one or more participant entities of the other target entity, and when the interactivity criterion is satisfied, identifying a participant entity that satisfies the interactivity criterion; and
a processor that executes the computer-executable instructions stored in one or more computer-readable storage media.

2. The computing system of claim 1 wherein the interactivity models for the target entity are stored at a computing device of the target entity.

3. The computing system of claim 1 wherein the interactivity model for a target entity and a participant entity includes totals of interactions between the target entity and that participant entity covering multiple time frames.

4. The computing system of claim 3 wherein the total for the most recent time frame is updated in real time as indications of interactions are received.

5. The computing system of claim 1 wherein the sent query specifies a target profile of another target entity.

6. The computing system of claim 1 wherein each interaction has an interaction type that is selected from a group consisting of a scheduled meeting, a voice mail, a phone call, and a document collaboration.

7. A method performed by a computing system for tracking interactivity between entities, the method comprising:
    accessing interactivity models, each interactivity model modeling interactions between a target entity and a participant entity, the interactivity models of the target entity being stored separately from the interactivity models of other target entities in a distributed matter;
    receiving indications of interactions between the target entity and participant entities;
    upon receiving an indication of an interaction between the target entity and a participant entity, updating in real time the interactivity model for the target entity and that participant entity;
    responding to a query by:
        receiving the query that specifies an interactivity criterion that specifies a characteristic of an interactivity model;
        analyzing interactivity models to determine whether the interactivity criterion is satisfied by one or more participant entities, wherein a participant entity satisfies the interactivity criterion when the interactivity model of the participant entity exhibits the characteristic; and
        sending a response to the query indicating whether the interactivity criterion is satisfied by one or more participant entities, and when the interactivity criterion is satisfied, identifying a participant entity that satisfies the interactivity criterion; and
    determining whether another target entity has participant entities that satisfy an interactivity criterion by:
        sending a query for the other target entity, the sent query specifying an interactivity criterion that specifies a characteristic of an interactivity model; and
        receiving a response to the sent query for the other target entity, the received response indicating whether the interactivity criterion is satisfied by one or more participant entities of the other target entity, and when the interactivity criterion is satisfied, identifying a participant entity that satisfies the interactivity criterion.

8. The method of claim 7 wherein the interactivity models for the target entity are stored at a computing device of the target entity.

9. The method of claim 7 wherein the interactivity model for a target entity and a participant entity includes totals of interactions between the target entity and that participant entity covering multiple time frames.

10. The method of claim 9 wherein the total for the most recent time frame is updated in real time as indications of interactions are received.

11. The method of claim 7 wherein the sent query specifies a target profile of another target entity.

12. The method of claim 7 wherein each interaction has an interaction type that is selected from a group consisting of a scheduled meeting, a voice mail, a phone call, and a document collaboration.

* * * * *